United States Patent [19]

Kelly

[11] 4,362,324

[45] Dec. 7, 1982

[54] JOINTED HIGH PRESSURE CONDUIT

[75] Inventor: John W. Kelly, Burbank, Calif.

[73] Assignee: Haskel Engineering & Supply Company, Burbank, Calif.

[21] Appl. No.: 133,009

[22] Filed: Mar. 24, 1980

[51] Int. Cl.³ .............................................. F16C 27/00
[52] U.S. Cl. .................................... 285/119; 285/168; 285/190; 29/523
[58] Field of Search ............... 285/190, 168, 165, 163, 285/119; 433/82, 84

[56] References Cited

U.S. PATENT DOCUMENTS

| 673,280 | 4/1901 | Moran | 285/190 X |
| 2,943,868 | 7/1960 | Hanback | 285/168 X |
| 3,088,759 | 5/1963 | Corsette | 285/190 |
| 3,189,999 | 6/1965 | Reiter | 433/82 |
| 3,466,062 | 9/1969 | Deplante | 285/190 X |
| 3,707,878 | 1/1973 | Treichler | 285/190 X |

FOREIGN PATENT DOCUMENTS

| 907782 | 7/1945 | France | 285/168 |
| 992512 | 7/1951 | France | 285/165 |
| 931243 | 7/1963 | United Kingdom | 285/190 |

Primary Examiner—Thomas F. Callaghan
Attorney, Agent, or Firm—Fulwider, Patton, Rieber, Lee & Utecht

[57] ABSTRACT

A high pressure fluid delivery conduit for use at pressures of 30,000 psi or more permitting relative movement of one end relative to the other only when fluid pressure is not applied thereto. The conduit is formed by a plurality of rigid tube-like sections arranged end-to-end and a plurality of movable joints connecting the sections. Each joint has an outer member in which an inner member is rotatably received. Outer and inner passageways defined by the outer and inner members at an interface location, respectively, communicate with each other regardless of the positions of the members. A pair of ring-shaped seals are disposed between the outer and inner members, for radial expansion upon the application of fluid pressure thereto to prevent the escape of the fluid. The seals are arranged on opposite sides of the interface location.

8 Claims, 2 Drawing Figures

JOINTED HIGH PRESSURE CONDUIT

FIELD OF THE INVENTION

The present invention relates to hydraulic conduits such as those used for swaging, and more particularly to such conduits for use at high pressures exceeding the upper limits of conventional flexible hoses.

BACKGROUND OF THE INVENTION

Conventional hoses which are used as conduits for hydraulic fluids generally have a maximum working pressure of less than 15,000 psi. This pressure limitation imposes severe restrictions on the design and configuration of certain types of equipment. For example, techniques such as swagging for the deformation of metal components often employ pressures in the 30,000 to 60,000 psi range.

Exemplary equipment of this type is used to expand metal tubes within the tube sheets of heat exchangers used as condensers in nuclear power plants. There may be more than a thousand such tubes extending through a single tube sheet and the task of expanding each tube is time consuming and labor intensive.

Conventionally, pressurized hydraulic fluid from a pump is supplied by a hose to a power head that is connected sequentially to a mandrel in each tube to be expanded. An intensifier is mounted on the power head to boost the pump pressure to the desired magnitude, using a combination of pistons of different diameters. The power head with the intensifier is a heavy and cumbersome piece of equipment that cannot be manipulated by one person without the aid of an elaborate support apparatus that restricts its freedom of movement significantly. If a flexible conduit were available, permitting universal movement at one end relative to the other and capable of withstanding pressures in the 30,000–60,000 psi range, it would be possible to mount the intensifier on the pump instead of the power head. Consequently, the head could be a much smaller, lighter and more compact tool that could be more quickly and easily manipulated.

It is believed that there are some circumstances in which rigid metal tube-like sections have been connected end-to-end with movable joints between them as a substitute for a hose. This type of construction is not always a suitable substitute, however, in circumstances in which the employment of a hose would impose undesirably low pressure limitations. The joints between the rigid sections are not capable of withstanding pressures sufficiently higher than those at which a hose could be used and often do not permit the desired freedom of movement. This pressure limitation dictates that such rigid section arrangements are not suitable for the tube and tube sheet application described above.

A principal objective of the present invention is to provide a high pressure fluid conduit that overcomes the above limitations of previously known devices.

SUMMARY OF THE INVENTION

The present invention relates to high pressure fluid delivery conduits of a type suitable for use with hydraulic pressures of 30,000 psi or more. It permits universal movement of one end of the conduit relative to the other when fluid pressure is not applied, but is capable of withstanding pressures far in excess of the upper limits of conventional flexible hoses or tube-and-movable-joint combinations.

The device of the invention includes a plurality of rigid tube-like sections, preferably metal, arranged end-to-end. A plurality of movable joints connect the sections. Each joint has an outer member in which an inner member is rotatably received. Outer and inner fluid passageways are defined by the outer and inner members, respectively, the passageways being arranged to communicate with each other at an interface location regardless of the relative positions of the outer and inner members.

A pair of ring-shaped seals are disposed between the outer and inner members and surround the inner member for radial expansions upon the application of fluid pressure thereto, thereby preventing the escape of fluid. The seals are arranged on opposite sides of the interface location.

According to one such joint construction, an annular cavity is formed between the inner and outer members at the interface location, the first and second passageways opening into the cavity to communicate with each other. The seals are located on opposite sides of the cavity, preferably being retained within annular grooves. The most effective seals each employ an O-ring and a relatively hard elastomeric back-up member, which may be formed of polyurethane.

Since the seals are located on opposite sides of the cavity, the hydraulic pressure that causes the seals to expand radially is applied equally in each direction and does not tend to cause the outer and inner members to separate from each other. While free rotation of the members relative to each other is possible when pressure is not applied, the radial expansion of the seals under pressure prevents movement of the joint once pressure is applied. This, however, is not a disadvantage since it is not normally desired to move the conduit while the pressure is being applied.

According to another aspect of the invention, the conduit described above is used to connect a power head to a pressure source. Because of the high pressure to which the conduit is subjected, the intensifier can be included in the pressure source, rather than mounted on the power head. According to one embodiment of the invention, the power head includes a mandrel for swaging of tubes in tube sheets.

Other features and advantages of the present invention will become apparent from the following detailed description, taken in conjunction with the accompanying drawings which illustrate, by way of example, the principles of the invention.

DESCRIPTION OF THE PREFERRED EMBODIMENT

Figure 1:
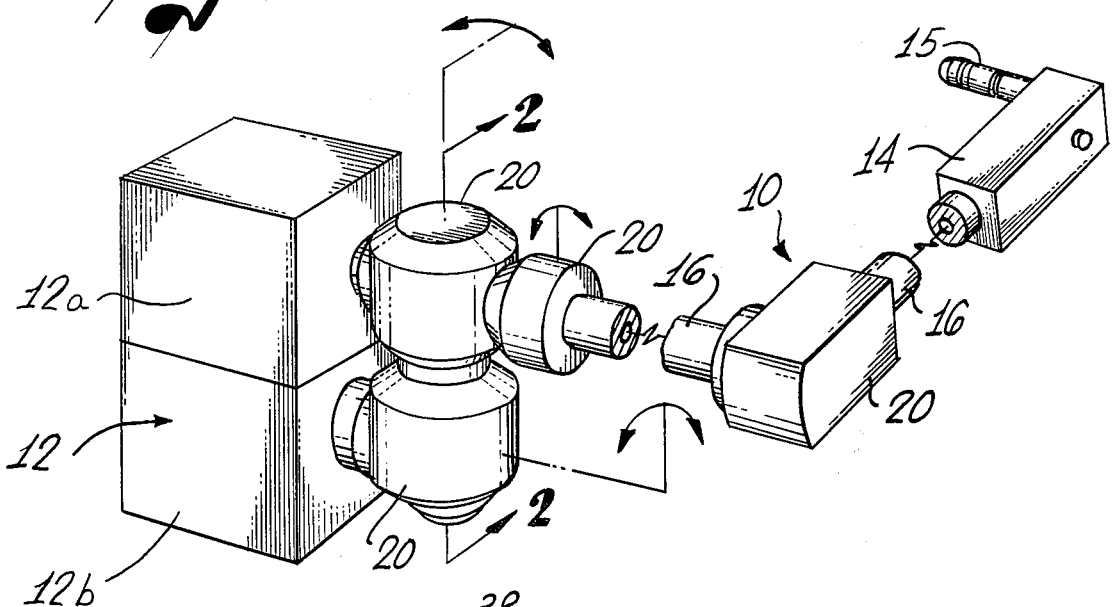
FIG. 1 is a perspective view of a pressure source, conduit and power head constructed in accordance with the present invention.

A high pressure fluid conduit 10, constructed in accordance with the present invention and shown in FIG. 1 of the accompanying drawings, is employed in connection with a hydraulic pressurizing apparatus that includes a pressure source 12 and a power head 14. Hydraulic fluid is pressurized by the source 12, which includes a pump 12a and an intensifier 12b. The power head 14 is used to deliver high pressure fluid to work pieces such as tubes to be expanded within a tube sheet by coupling the head to mandrels 15 within the tubes (not shown).

There is no intensifier for increasing the pressure at the power head 14. Instead, the conduit 10 is capable of withstanding working pressures in the range of 30,000 to 60,000 psi or more generated by the pressure source 12, thus eliminating the need for an increase in pressure at the power head 14.

The conduit 10 is made up of a plurality of rigid thick-walled metal tube-like sections 16 of the type used in high pressure applications, the sections being connected end-to-end. Typically, the inside diameter of such a section 16 would only be about one third its outside diameter.

The sections 16, the pressure source 12 and the power head 14 are connected by a plurality of thick-walled joints 20. In FIG. 1, only certain representative joints 20 and fragmentary portions of the conduit sections 16 are shown. It will be understood that these joints 20 and sections 16 may be assembled in virtually any number and combination desired for a particular application. The joints 20 may be connected to each other in groups of two, three, or even more, as desired, depending upon the need for relative movement between adjacent components. In this case, a large enough number of joints 20 are included to permit universal movement of the power head 14 relative to the pressure source 12.

Figure 2:
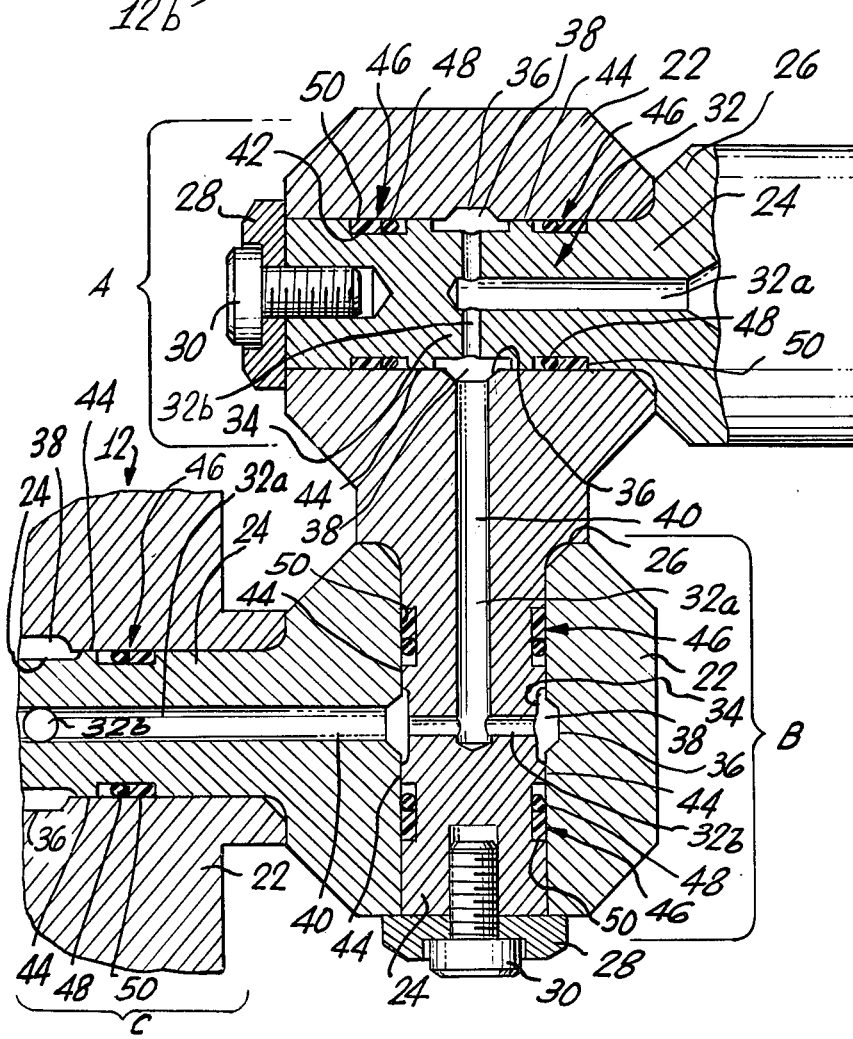
FIG. 2 is an enlarged cross-sectional view of two of the joints and part of a third joint of the apparatus of FIG. 1 taken along the line 2—2.

Three such joints 20 are shown in FIG. 2. These joints, designated A, B and C, are arranged in series to connect the pressure source 12 to the first of the tube sections 16. Each joint 20 includes an outer member 22 in which an inner member 24 is rotatable. The outer member 22 of one joint 20 can be integrally formed with the inner member 24 of the next joint to provide an advantageous multiple-joint arrangement with a minimum number of parts. For example the outer member 22 of the upper joint A is integrally formed with the inner member 24 of the adjacent intermediate joint B. In the third joint C on the lower lefthand side of FIG. 2, the outer member 22 is integrally formed with the wall of the power supply 12.

Since these joints 20 are generally of the same construction, only the upper joint A will be separately described below. The outer member 22 has a cylindrical through bore in which it rotatably receives the cylindrical inner member 24. A shoulder 26 at one end of the inner member 24 and a cap 28 at the opposite end, secured by a screw 30, prevent the inner member from moving axially with respect to the outer member 22.

An inner passageway 32 of the joint A, in which the end of the tube section is secured, has a first section 32a that forms a continuation of the first tube section 16, extending along the center axis of the inner member 24. A second section 32b of the first passageway 32 is in the form of a diametrical cross-bore that opens at each end into a reduced diameter center portion 34 of the inner member.

Coinciding with the reduced diameter portion 34 of the inner member 24 is a ring-shaped depression 36 or groove of trapezoidal cross-section in the inner surface of the outer member, so that an annular cavity 38 is formed between the outer and inner members 22 and 24. A radial bore in the outer member 22, that forms an outer passageway 40, opens into the annular cavity 38. Thus the cavity 38 defines an interface location between the inner and outer passageways 32 and 40 communicate.

Regardless of the relative positions of the outer and inner members 22 and 24, there is always fluid flow between the inner and outer passageways 32 and 40 through the cavity 38. The outer passageway 40 of the outer member 22 of the upper joint A becomes the first section 32a of the inner passageway 32 of the intermediate joint B. It will be understood that the fluid flows through the entire series of joints A, B and C in the general manner described above, proceeding ultimately through inner and outer passageways.

On each side of the cavity 38 is an annular seal groove 42 separated from the cavity by a land 44. Within each seal groove 42, a seal 46 is retained surrounding the inner member 24. Each seal 46 includes a relatively soft O-ring 48 and a relatively hard ring-shaped back-up member 50. Preferably, the back-up member 50 is made of elastomeric polyurethane and is of rectangular cross-section. The O-ring 48 of each seal 46 is closest to the cavity 38.

When pressure is applied, fluid within the cavity 38 flows past the lands 44 and applies pressure to the O-rings 48, which in turn apply pressure to the back-up members 50. The seals 46 are thus compressed axially and expanded radially so that they press against the opposed surfaces of the outer and inner members 22 and 24. With the seals 46 in this pressurized condition, relative movement of the outer and inner members 22 and 24 is not possible and the conduit sections 16 are thus temporarily fixed in relation to each other. When no fluid pressure is applied, however, little resistance is offered to the rotation of the inner member 24 relative to the outer member 22, and the conduit sections 16 are freely movable with respect to each other.

It will be noted that no matter how much hydraulic pressure is applied to the joints 20, there is no tendency for the outer and inner members 22 and 24 to separate from each other. This is because pressure supplied to the annular cavity 38 is always applied equally in two opposite directions to the two seals 46. Moreover, the seals 46 are so constructed that they seal more tightly as the fluid pressure increases to prevent leakage. If a proper elastomeric material having the necessary memory is chosen, the upper pressure limit of the joint 20 is determined essentially by the structural integrity of the outer and inner members 22 and 24. Thus, extremely high working pressures can be safely attained.

While a particular form of the invention has been illustrated and described, it will be apparent that modifications can be made without departing from the spirit and scope of the invention.

I claim:

1. A high pressure hydraulic tool comprising:
a source of hydraulic pressure including intensifier means for producing a fluid pressure of at least 30,000 psi;
power head means for applying said fluid pressure to a work piece;
a plurality of rigid thick-walled sections arranged end to end from said source to said power head means; and
a plurality of joint means for connecting said sections to each other, to said source and to said power head means to form a conduit for the transmission of said fluid pressure, each of said joint means comprising:

(a) a thick-walled outer member having a bore therein;

(b) a generally cylindrical thick-walled inner member rotatably received within said bore;

(c) an annular cavity defined between said outer and inner members;

(d) an outer passageway for hydraulic fluid extending through said outer member and opening into said cavity;

(e) an inner passageway for hydraulic fluid extending through said inner member and opening into said cavity, thus communicating with said outer passageway;

(f) a pair of seal retaining annular grooves on opposite sides of said cavity;

(g) a pair of sealing means each disposed in one of said grooves for permitting free relative rotational movement of said outer and inner members in the absence of said fluid pressure, and for expanding radially upon the application of said fluid pressure thereto thereby rendering said joint immovable and preventing the escape of said fluid from said cavity; and (h) means for securing said inner member within the bore of said outer member.

2. The device of claim 1 wherein each of said sealing means comprises a relatively soft ring-shaped member and a relatively hard ring-shaped member arranged side by side, said soft member being closer to said interface location.

3. The device of claim 2 wherein said soft member is an O-ring.

4. The device of claim 2 wherein said hard member is formed of polyurethane.

5. The device of claim 1 wherein at least a portion of said inner passageway extends along the axis of rotation of said inner member and said outer passageway is perpendicular to said axis and opens into said cavity.

6. A high pressure hydraulic tool comprising:
a source of hydraulic pressure including intensifier means for producing a fluid pressure of at least 30,000 psi;
power head means for applying said fluid pressure to a work piece;
a plurality of rigid thick-wall sections arranged end to end from said source to said power head means; and
a plurality of joint means for connecting said sections to each other, to said source and to said power head means to form a conduit for the transmission of said fluid pressure, each of said joint means comprising:

(a) a thick-walled outer member having a bore therein;

(b) a generally cylindrical thick-walled inner member rotatably received within said bore;

(c) an annular cavity defined between said outer and inner members;

(d) an outer passageway for hydraulic fluid extending through said outer member and opening into said cavity;

(e) an inner passageway for hydraulic fluid extending through said inner member and opening into said cavity, thus communicating with said outer passageway;

(f) a pair of seal retaining annular grooves on opposite sides of said cavity;

(g) a pair of sealing means each disposed in one of said grooves for permitting free relative rotational movement of said outer and inner members in the absence of said fluid pressure, and for expanding radially upon the application of said fluid pressure thereto thereby rendering said joint immovable and preventing the escape of said fluid from said cavity, each of said sealing means comprising an O-ring and a polyurethane backup member; and (h) means for securing said inner member within the bore of said outer member.

7. A high pressure hydraulic swaging tool for radially expanding tubes within tube sheets comprising:
a source of hydraulic pressure including intensifier means for producing a fluid pressure of at least 30,000 psi;
a power head including mandrel means for internally applying said fluid pressure to said tubes;
a plurality of rigid thick-walled sections arranged end to end from said source to said power head;
a plurality of joint means for connecting said sections to each other, to said source and to said power head to form a conduit for the transmission of said fluid pressure, each of said joint means comprising:

(a) a thick-walled outer member having a bore therein;

(b) a generally cylindrical thick-walled inner member rotatably received within said bore;

(c) an annular cavity defined between said outer and inner members;

(d) an outer passageway for hydraulic fluid extending through said outer member and opening into said cavity;

(e) an inner passageway for hydraulic fluid extending through said inner member and opening into said cavity, thus communicating with said outer passageway;

(f) a pair of seal retaining annular grooves on opposite sides of said cavity;

(g) a pair of sealing means each disposed in one of said grooves for permitting free relative rotational movement of said outer and inner members in the absence of said fluid pressure, and for expanding radially upon the application of said fluid pressure thereto thereby rendering said joint immovable and preventing the escape of said fluid from said cavity; and (h) means for securing said inner member within the bore of said outer member.

8. A high pressure hydraulic swaging tool for radially expanding tubes within tube sheets comprising:
a source of hydraulic pressure including intensifier means for producing a fluid pressure of at least 30,000 psi;
a power head including mandrel means for internally applying said fluid pressure to said tubes;
a plurality of rigid thick-walled sections arranged end to end from said source to said power head;
a plurality of joint means for connecting said sections to each other, to said source and to said power head to form a conduit for the transmission of said fluid pressure, each of said joint means comprising:

(a) a thick-walled outer member having a bore therein;

(b) a generally cylindrical thick-walled inner member rotatably received within said bore;

(c) an annular cavity defined between said outer and inner members;
(d) an outer passageway for hydraulic fluid extending through said outer member and opening into said cavity;
(e) an inner passageway for hydraulic fluid extending through said inner member and opening into said cavity, thus communicating with said outer passageway;
(f) a pair of seal retaining annular grooves on opposite sides of said cavity;
(g) a pair of sealing means each disposed in one of said grooves for permitting free relative rotational movement of said outer and inner members in the absence of said fluid pressure, and for expanding radially upon the application of said fluid pressure thereto thereby rendering said joint immovable and preventing the escape of said fluid from said cavity, each of said sealing means comprising an O-ring and a polyurethane backup member; and
(h) means for securing said inner member within the bore of said outer member.

* * * * *